United States Patent [19]

Jakubowski

[11] Patent Number: 5,042,903
[45] Date of Patent: Aug. 27, 1991

[54] HIGH VOLTAGE TOW CABLE WITH OPTICAL FIBER

[75] Inventor: Paul R. Jakubowski, Lutherville, Md.

[73] Assignee: Westinghouse Electric Corp., Pittsburgh, Pa.

[21] Appl. No.: 559,058

[22] Filed: Jul. 30, 1990

[51] Int. Cl.$^5$ .............................................. G02B 6/44
[52] U.S. Cl. ..................................................... 385/101
[58] Field of Search ................ 350/96.20, 96.23, 96.21

[56] References Cited

U.S. PATENT DOCUMENTS

| | | | |
|---|---|---|---|
| 4,645,298 | 2/1987 | Gartside, III | 350/96.23 |
| 4,816,620 | 3/1989 | Beach | 174/115 |
| 4,826,278 | 5/1989 | Gartside, III et al. | 350/96.23 |
| 4,867,527 | 9/1989 | Dotti et al. | 350/96.23 |

Primary Examiner—John D. Lee
Assistant Examiner—Phan T. Heartney
Attorney, Agent, or Firm—D. Schron

[57] ABSTRACT

A relatively small diameter tow cable including a plurality of high and low voltage electrical conductors and a high bandwidth optical fiber for both electrical and data transmission between an aircraft and a towed body. The tow cable is implemented by a coaxial arrangement of a central optical fiber encased by a stainless steel jacket surrounded by a first set of high voltage conductors. A second set of high voltage conductors concentrically surrounds the first set of conductors but is separated therefrom by a layer of high voltage insulation. A layer of high voltage insulation surrounds the second set of high voltage conductors and a set of relatively low voltage conductors and their respective return conductors are circumferentially spaced around this layer of insulation along with opposing sets of insulating spacers. A third layer of insulating material surrounds the low voltage conductors and the spacers. Outwardly of the third layer of insulating material are a pair of coaxial strength members comprised of synthetic aramid fibers and which are then covered with a polyester and metallic braid. An outermost jacket of semiconductive material is also provided which serves as an electrostatic drain to ground for the cable.

11 Claims, 1 Drawing Sheet

HIGH VOLTAGE TOW CABLE WITH OPTICAL FIBER

BACKGROUND OF THE INVENTION

1. Field of the Invention

This invention relates generally to electrical cables including a plurality of coaxial conductors and more particularly to an aircraft type tow cable of reduced size including conductors for both electrical and optical energy.

2. Description of the Prior Art

Conventional aircraft tow cables used in connection with towed bodies, such as drones, provide an electrical connection between the aircraft and the towed body to supply power and control the various devices in the towed body. This allows high voltage power supplies, control circuitry and heavy signal processing equipment to be removed from the towed body and placed on the aircraft. This significantly reduces the size and cost of the towed body while substantially increasing its technical capabilities.

The size of the cable is a critical element in reducing aerodynamic drag and therefore the ultimate size of the towed body and the load on the aircraft. Typically the tow cables include a set of electrical conductors arranged about a central non-metallic strength member or the set of conductors are encased by one or more external strength members and which are futher protected by an outer protective covering or cladding.

SUMMARY OF THE INVENTION

Accordingly, it is an object of the present invention to provide an improvement in electromechanical tow cables.

It is another object of the invention to provide an improvement in tow cables which include both power and data transmission capabilities.

It is yet a further object of the invention to provide a tow cable of relatively small size and weight per unit length yet one exhibiting a high tensile strength, for the transmission of both electrical and optical energy between a towing craft and the towed body.

Briefly, the foregoing and other objects of the invention are achieved in a relatively small diameter tow cable primarily but not exclusively used in connection with an aircraft towing system which provides a high strength link including a plurality of high and low voltage electrical conductors and a high bandwidth optical fiber for both electrical and data transmission between the aircraft and the towed body. The tow cable is comprised of a coaxial arrangement of a central optical fiber encased by a stainless steel jacket surrounded by a first set of high voltage conductors. A second set of high voltage conductors concentrically surrounds the first set of conductors but is separated therefrom by a layer of high voltage insulation. A layer of high voltage insulation surrounds the second set of high voltage conductors and a set of relatively low voltage conductors and their respective return conductors are circumferentially spaced around this layer of insulation along with opposing sets of insulating spacers. A third layer of insulating material surrounds the low voltage conductors and the spacers. Outwardly of the third layer of insulating material are a pair of coaxial strength members comprised of synthetic aramid fibers and which are then convered with a metallic braid. A outermost jacket of semiconductive material is also provided which serves as an electrostatic drain to ground for the cable.

BRIEF DESCRIPTION OF THE DRAWINGS

The following detailed description of the invention will become more readily understood when considered in conjunction with the accompanying drawings in which.

DETAILED DESCRIPTION OF THE INVENTION

By way of further background, the subject invention was developed primarily for use in connection with the towing of mechanisms, such as drones, behind an aircraft. Its application, however is not limited thereto and may, when desired, be extended to other types of tow links where size is a critical factor. Examples include undersea towed bodies or remotely operated vehicles.

In the subject invention, several critical design factors are brought into play: (1) the diameter and weight of the cable; (2) the number of voltage and current capacity of the various electrical conductors; (3) data transmission requirements; (4) the ultimate strength working load requirements; and (5) the required working life of the cable. The diameter and weight are directly related to the drag that the cable produces and thus affects the load on the aircraft.

In addition to the cable's direct effect on the aerodynamic drag of the entire system, the electrical and data transmission capabilities of the cable also affect the size and functionality of the towed body. Thus the more electrical power and signal transmission capabilities that are provided by the cable, the fewer electrical transformers and signal processing equipment that need to be packaged in the towed body. Therefore, any equipment that can be removed from the towed body reduces its size, weight, cost and the drag it produces. Accordingly, the smaller the "non-strength member" elements of the cable are, i.e. the electrical data and transmission members, the more the strength member's portion is reduced because of loads on the cable are reduced. Therefore, a cable design which provides the required capabilities with a minimum size and weight results in a significant improvement to the overall system design.

Figure 1:
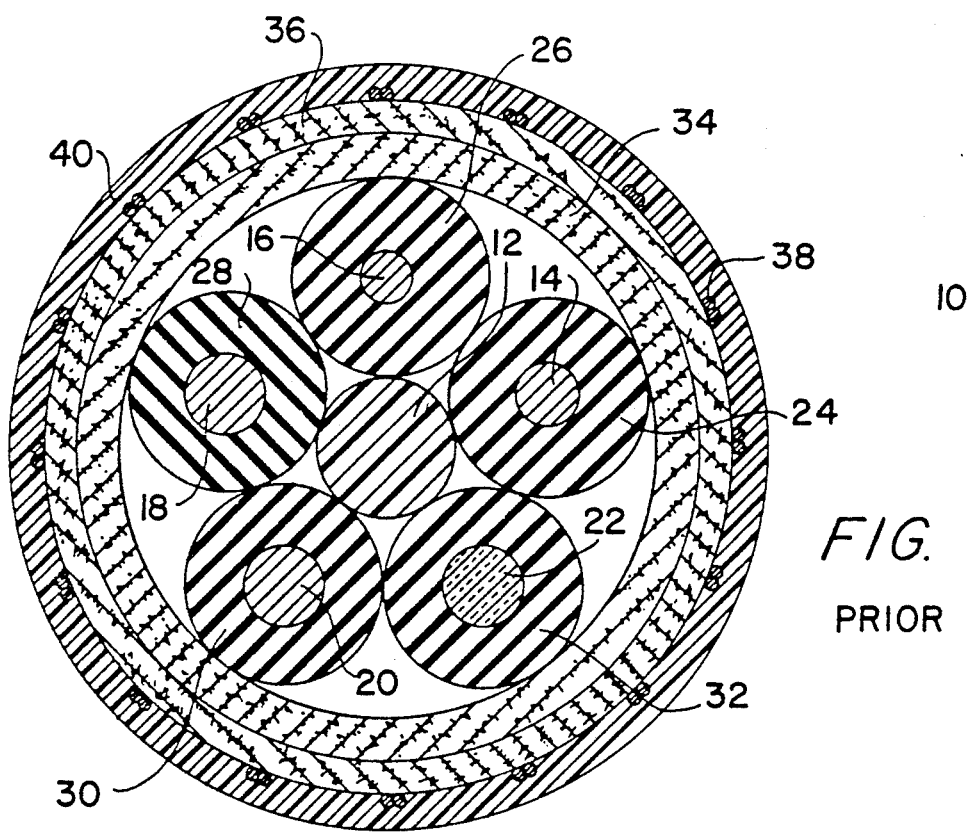
FIG. 1 is a transverse cross sectional view of a tow cable in accordance with the known prior art.

Referring now to the drawings and more particularly to FIG. 1, illustrated thereat is a cross section of a known prior art tow cable which includes both electrical and optical transmission conducting members. As shown, reference numeral 10 denotes a tow cable having a diameter in the order of 0.35 inches. The tow cable includes a centralized plastic core member 12 comprised of a high dielectric medium such as a fluoropolymer. Circumferentially spaced around the core 12 are five insulated conductors, four of which 14, 16, 18 and 20, comprise electrical conductors, while the fifth conductor 22 comprises a fiber optic conductor. Each of the conductors, moreover, are helically wound around the core member 12 and are surrounded by respective high electric dielectric or insulator casings 24, 26, 28, 30 and 32 which are contiguous, one to another, while being in contact with the outer surface of the plastic core 12. The space between the insulated members 14, ... 22 is filled with a conventional void filler material, not shown. Externally thereto there is provided a pair of coaxial non-metallic strength members 34 and 36 comprised of synthetic fibers preferably but not exclusively comprised of an aromatic amide organic fiber commonly referred to as an aramid. One such example comprises the product known as "Kevlar" produced by the DuPont Company of Wilmington, Del. A layer of mixed, polyester and metallic braid 38 embedded in an electrically insulating protective jacket comprised of a suitable thermoplastic polymer such as polyethylene.

Such a configuration results in a tow cable having a weight in the order of 62Lbs./kft and exhibiting a tensile strength of 5,400 pounds.

Figure 2:
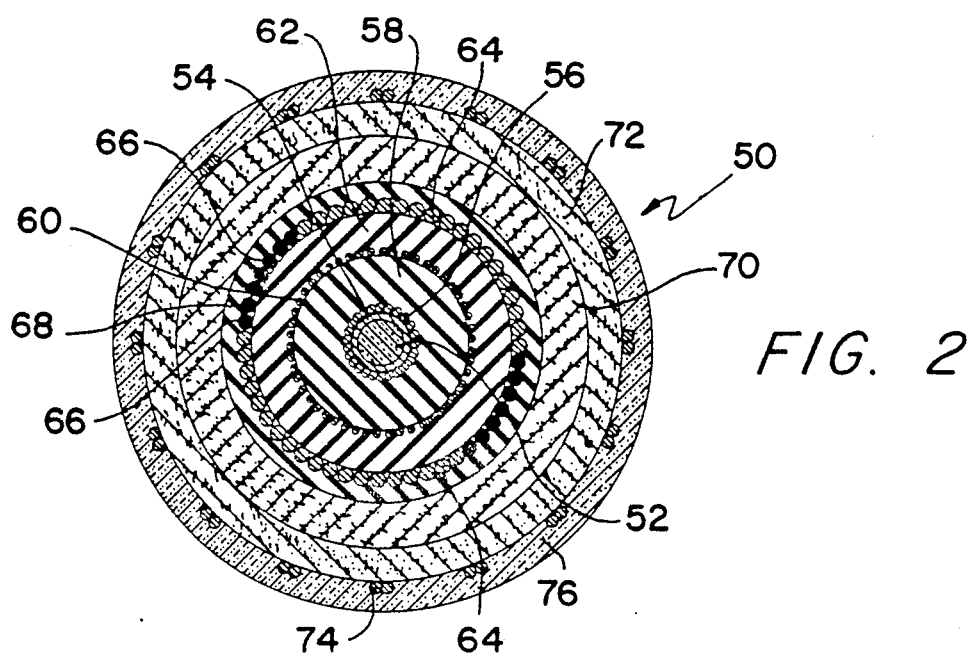
FIG. 2 is transverse cross sectional view of a tow cable in accordance with the preferred embodiment of the invention.

Turning now to the preferred embodiment of the invention, reference is made to FIG. 2 wherein reference numeral 50 denotes a tow cable of coaxial construction whose innermost or central axial member comprises a fiber optic conductor 52 encased in a stainless steel jacket 54. Circumferentially spaced around the outer surface of the steel jacket 54 is a first set of helically wound electrical conductors 56 for the application of a first and a relatively high voltage, e.g. 5.0kv, and which are directly surrounded by a dielectric medium 58 comprising a layer of 5.0kv insulation, for example. A second set of helically wound electrical conductors 60 for the application of a second relatively high voltage, for example 2.5kv, is circumferentially disposed around the outer surface of the insulator 58 and being directly surrounded by a second dielectric medium 62 comprising, for example, a coaxial layer of 2.5kv insulation. A third set of helically wound electrical conductors 64 for the application of a third and relatively low voltage 270v are circumferentially disposed on the outer surface of the insulator 60 with one half of the conductors constituting the return conductors for the other half and being separated therefrom by a set of circumferentially disposed insulating spacers 66 comprising monofilaments of the same size as the conductors 64. A third dielectric medium 68 comprising a layer 68 of insulation and consisting of 270v insulation surrounds both the conductors 64 and the monofilament spacers 66. External to the dielectric medium 68 is a first coaxial non-metallic strength member 70 comprised of Kevlar yarn. A second non-metallic strength member 72 comprising a second layer of Kevlar yarn, is contiguously formed around the first layer 70. The two layers 68 and 70 are contrahelically wound along the length of the structure 50. Finally, the cable structure 50 is jacketed with a layer 76 of semiconductor material which also envelops a mixed, polyester and metallic braid 74 formed on the outer strength member 70 to serve as an electrostatic drain to ground when installed as a tow cable between a towing vehicle and towed body, not shown.

Accordingly, the configuration shown in FIG. 2 operates to create a geometric and weight advantage over prior art designs by producing a smaller electro-optical core. Moreover, the steel cased fiber optical fiber 52 operates to provide a relatively wide bandwidth in the order of 18GHz for the transmission of data between the towing vechicle which may be an aircraft, and the towed body which may be a drone, and adequately fulfills a predetermined data transmission requirement without the necessity of adding large quantities of copper conductors or coaxial cable. The placement of the optical fiber 52, moreover, in the center of the structure allows the cable 50 to be bent in a smaller radius than other designs such as that such in FIG. 1 due to the fact that the fiber does not experience any bends in the cable itself due to the cabling helix of prior art designs. Since the optical fiber 52 ceases to transmit light below a certain minimum bend radius, the smaller bend radius of the configuration shown in the embodiment of FIG. 2 is important because it permits handling equipment and sheaves to be smaller and lighter than with conventional designs.

The concentric packaging of the electrical conductors 56, 60, and 64 and their respective insulation layers 58, 62 and 68 provide a much smaller cross sectional area than prior art apparatus. The necessary voltage drop in current carrying capacity for each electrical conductor is provided by using a novel construction technique outlined as follows. First the required size of a traditional, single solid copper conductor is calculated. Then the cross sectional area of this conductor is "spread" over the current circumference of the cable by using a plurality of smaller conductors which are circumferentially spaced as shown in FIG. 2. This spreading of the electrical conductors over a large effective circumference in effect distributes the voltage stress on the insulation, thus allowing for thinner insulation walls while maintaining the same electrical stresses as exists in the prior art structures. This is a critical advantage in applications where the size and weight of the cable are of major importance.

With respect to the low voltage conductors 64, even more space and weight are saved in the preferred embodiment of the invention by placing more than one conductor on a single layer. With lower voltage stresses between the conductors 64, it is possible to provide the necessary electrical isolation by the used of non-conductive material such as Dacron on Nylon for the spacer elements 66. In this manner, a single dielectric layer serves to insulate one half the conductor 64 from the other half which operate as current return conductors.

Additionally, the relatively smaller diameter of the electro-optical core 52 permits the size of the strength members 70 and 72 to be reduced, resulting in a tow cable 50, which is relatively smaller in diameter and thereby produces less aerodynamic drag and load on the cable. This in effect means that the larger a tow cable is in diameter, the more the strength members must be enlarged or the number must be increased to produce a cable with the same overall working capabilities.

The resulting configuration in FIG. 2 provides a tow cable 50 which is typically 0.284 inches in diameter, a size reduction in the order of 20%, while providing substantially the same nominal brake strength of 5,400 lbs., with the reduced weight in the order of 51 lbs./kft.

Thus what has been shown and described is an improved design for an aircraft tow cable consisting of non-metallic strength members, multiple high voltage electrical conductors, high power-low voltage conductors and a relatively high bandwidth optical data transmission line in a relatively smaller diameter package than a conventional design while still having identical operating capabilities.

Having thus shown and described what is at present considered to be the preferred embodiment of the invention, it is to be noted that the same has been made by way of illustration and not limitation. Accordingly, all modifications, alterations and changes coming within the spirit and scope of the invention are herein meant to be included.

I claim:

1. A coaxial tow cable for the transmission of both electrical and optical energy, comprising:

unitary central axial fiber optic conductor means and a metal casing surrounding said central axial fiber optic conductor means, said casing further having an outer surface;

a first set of electrical conductors circumferentially disposed on the outer surface of said metal casing for application of a first electrical voltage;

a first dielectric medium surrounding said first set of electrical conductors, said first dielectric having an outer surface;

a second set of electrical conductors circumferentially disposed on the outer surface of said first dielectric medium for application of a second electrical voltage;

a second dielectric medium surrounding said second set of electrical conductors, said second dielectric also having an outer surface;

a third set of electrical conductors circumferentially disposed of the outer surface of said second dielectric medium for application of a third and fourth electrical voltage;

a third dielectric medium surrounding said third set of electrical conductors;

strength member means comprised of synthetic fibers surrounding said third dielectric medium, said strength means including an outer surface;

polyester and metallic braid means disposed on the other surface of said strength member means; and an electrically conducting outer jacket disposed over said polyester and metallic braid means which operates as an electrostatic current drain for the tow cable.

2. The coaxial tow cable according to claim 1, wherein said strength member means comprises a pair of contiguous strength members.

3. The coaxial tow cable according to claim 2 wherein said pair of strength members are comprised of synthetic fibers contrahelically wound along the length of said cable.

4. The coaxial tow cable according to claim 1 wherein said synthetic fibers are comprised of aramid fibers.

5. The coaxial tow cable according to claim 4 wherein said outer jacket is comprised of semiconductive material.

6. The coaxial tow cable according to claim 1 wherein said third set of electrical conductors comprises two subsets of conductors mutually separated by electrically insulating spacer means.

7. The coaxial tow cable according to claim 6 wherein one of said subsets form an electrical ground return for the other of said subsets and wherein said spacer means comprises two groups of insulating members.

8. The coaxial tow cable according to claim 7 wherein each group of insulating members are comprised of a plurality of insulating filaments arranged side by side circumferentially around said second dielectric medium between said two subsets of conductors.

9. The coaxial tow cable according to claim 8 wherein said first and second voltage comprises a relatively high voltage, and wherein said third voltage comprises a relatively lower voltage.

10. The coaxial tow cable according to claim 9 wherein first relatively high voltage is greater than said second relatively high voltage.

11. The coaxial tow cable according to claim 1 wherein said central axial fiber optic conductor means comprises a single optic conductor.

* * * * *